US010301010B2

(12) United States Patent
Heverly, II

(10) Patent No.: US 10,301,010 B2
(45) Date of Patent: May 28, 2019

(54) OSCILLATING PUMP SYSTEMS FOR USE ON AIRCRAFT

(71) Applicant: Bell Helicopter Textron Inc., Fort Worth, TX (US)

(72) Inventor: David E. Heverly, II, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 456 days.

(21) Appl. No.: 15/298,693

(22) Filed: Oct. 20, 2016

(65) Prior Publication Data

US 2018/0111679 A1  Apr. 26, 2018

(51) Int. Cl.
*B64C 27/00* (2006.01)
*F04C 2/10* (2006.01)
*F04C 14/14* (2006.01)
*F04C 15/06* (2006.01)

(52) U.S. Cl.
CPC ............ *B64C 27/001* (2013.01); *F04C 2/102* (2013.01); *F04C 14/14* (2013.01); *F04C 15/064* (2013.01); *B64C 2027/002* (2013.01); *B64C 2027/004* (2013.01)

(58) Field of Classification Search
CPC .. F04C 15/0042; F04C 15/008; F04C 15/064; F04C 14/14; F04C 2/102; F04C 11/001; F04C 18/082; F04C 2/103; F04C 2/104; F04C 2/105; F04C 28/14; B64C 27/001; B64C 2027/002; B64C 2027/004; F16F 13/06; F16F 15/02; F16F 15/023

USPC ........................................ 418/61.3, 131, 132
See application file for complete search history.

(56) References Cited

U.S. PATENT DOCUMENTS

| 4,046,235 | A | * | 9/1977 | Shutt | ........................ | B66D 5/22 |
| | | | | | | 188/134 |
| 4,236,607 | A | | 12/1980 | Halwes et al. | | |
| 5,435,531 | A | | 7/1995 | Smith et al. | | |
| 5,439,082 | A | | 8/1995 | McKeown et al. | | |
| 6,106,240 | A | * | 8/2000 | Fischer | ................... | F04C 2/102 |
| | | | | | | 417/203 |
| 8,499,907 | B2 | | 8/2013 | Smith et al. | | |
| 9,145,946 | B2 | | 9/2015 | David et al. | | |
| 9,249,856 | B1 | | 2/2016 | Lee et al. | | |
| 2013/0045125 | A1 | * | 2/2013 | Yarr | ........................ | F01C 1/103 |
| | | | | | | 418/166 |
| 2013/0119591 | A1 | | 5/2013 | Lee et al. | | |

* cited by examiner

*Primary Examiner* — Medhat Badawi
*Assistant Examiner* — Vincente Rodriguez
(74) *Attorney, Agent, or Firm* — Lawrence Youst PLLC

(57) ABSTRACT

An oscillating pump system includes a pump operable to circulate a fluid. The pump has a first port stage including an inlet port and an outlet port and a second port stage including a first oscillating port and a second oscillating port. An oscillator disk is disposed between the first port stage and the second port stage. The oscillator disk is rotatable relative to the inlet port, the outlet port, the first oscillating port and the second oscillating port. During rotation, the oscillator disk alternatingly routes the fluid to the inlet port from the first and second oscillating ports and alternatingly routes the fluid from the outlet port to the first and second oscillating ports, thereby generating oscillating fluid flow.

20 Claims, 11 Drawing Sheets

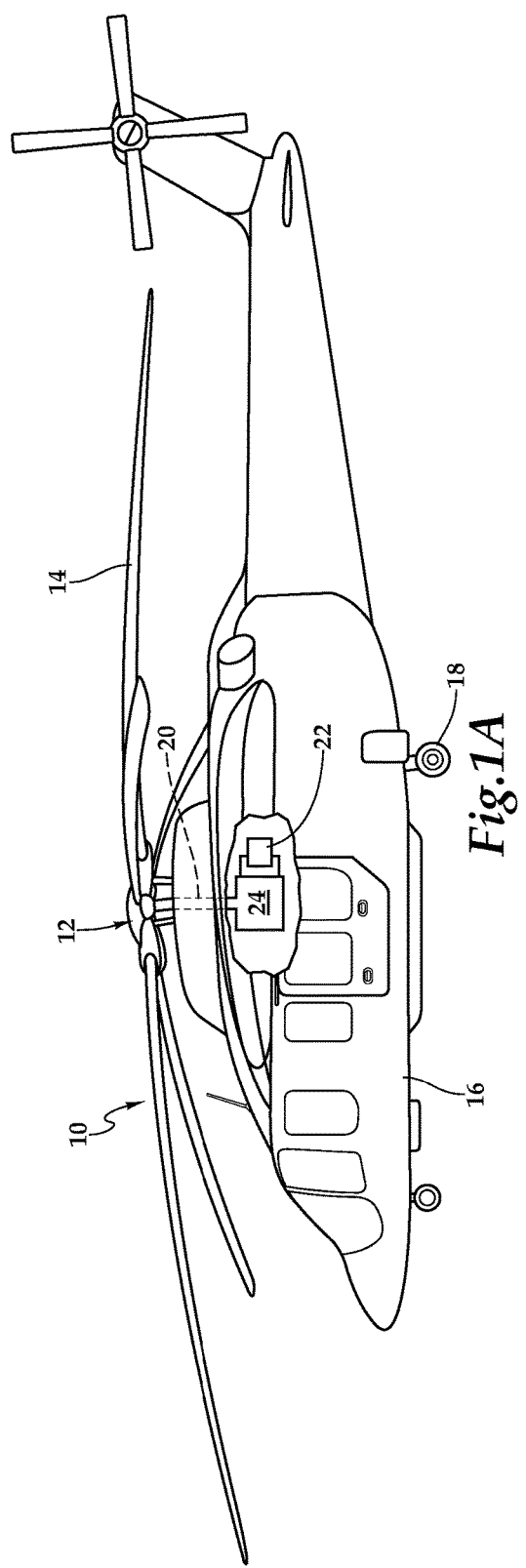
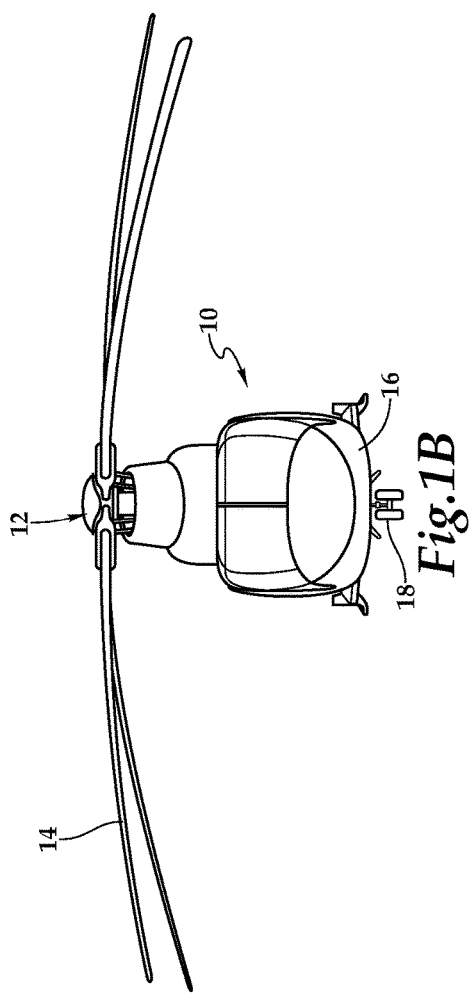

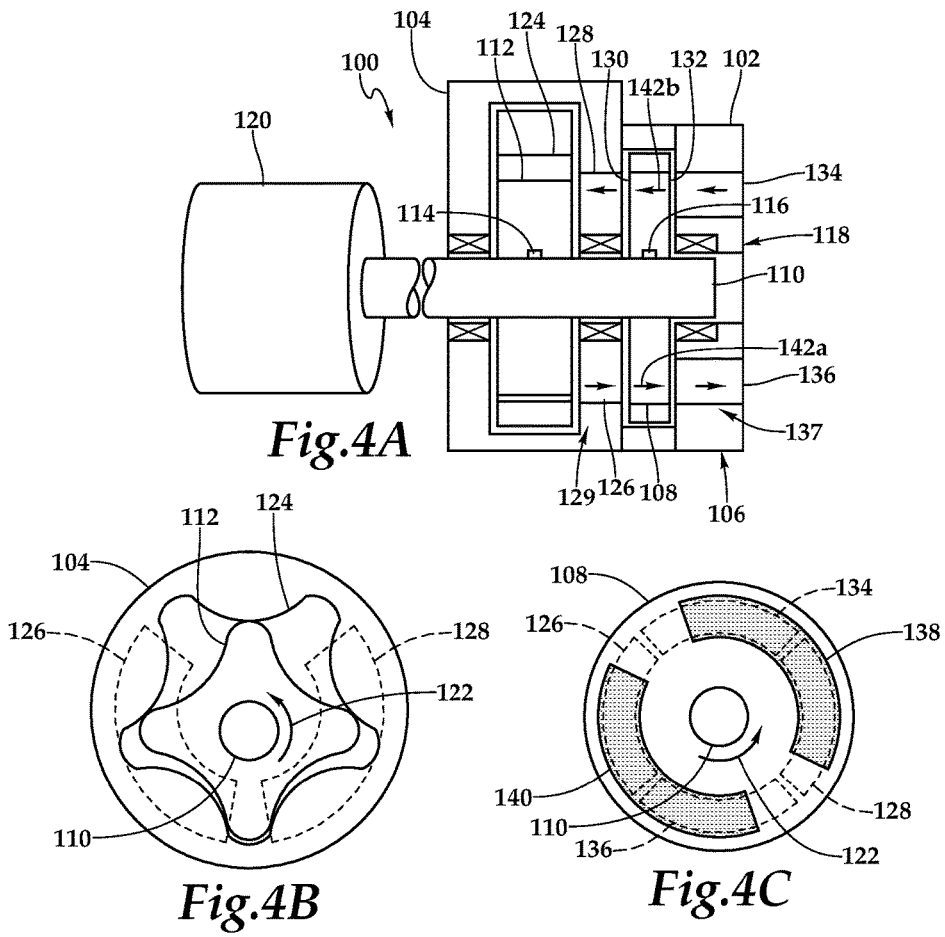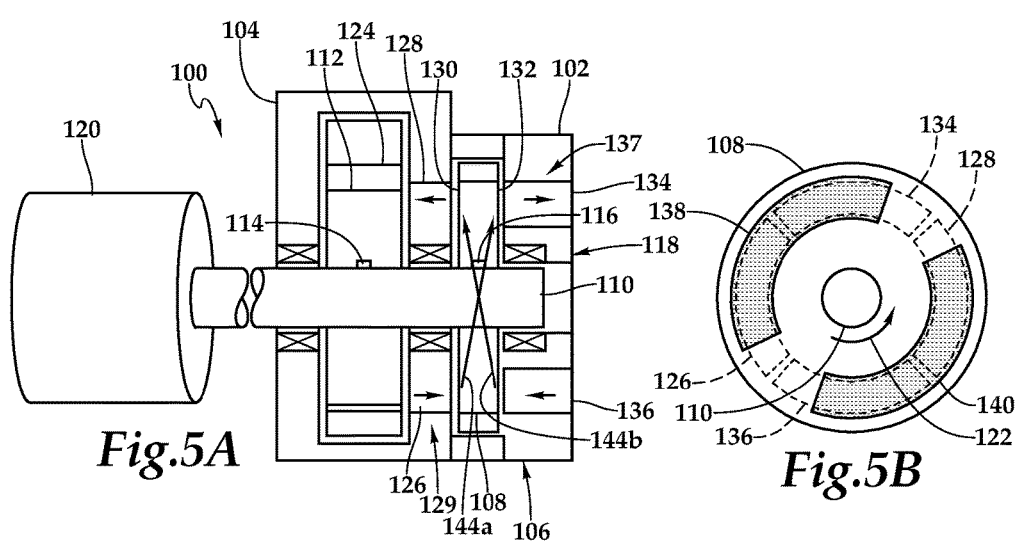

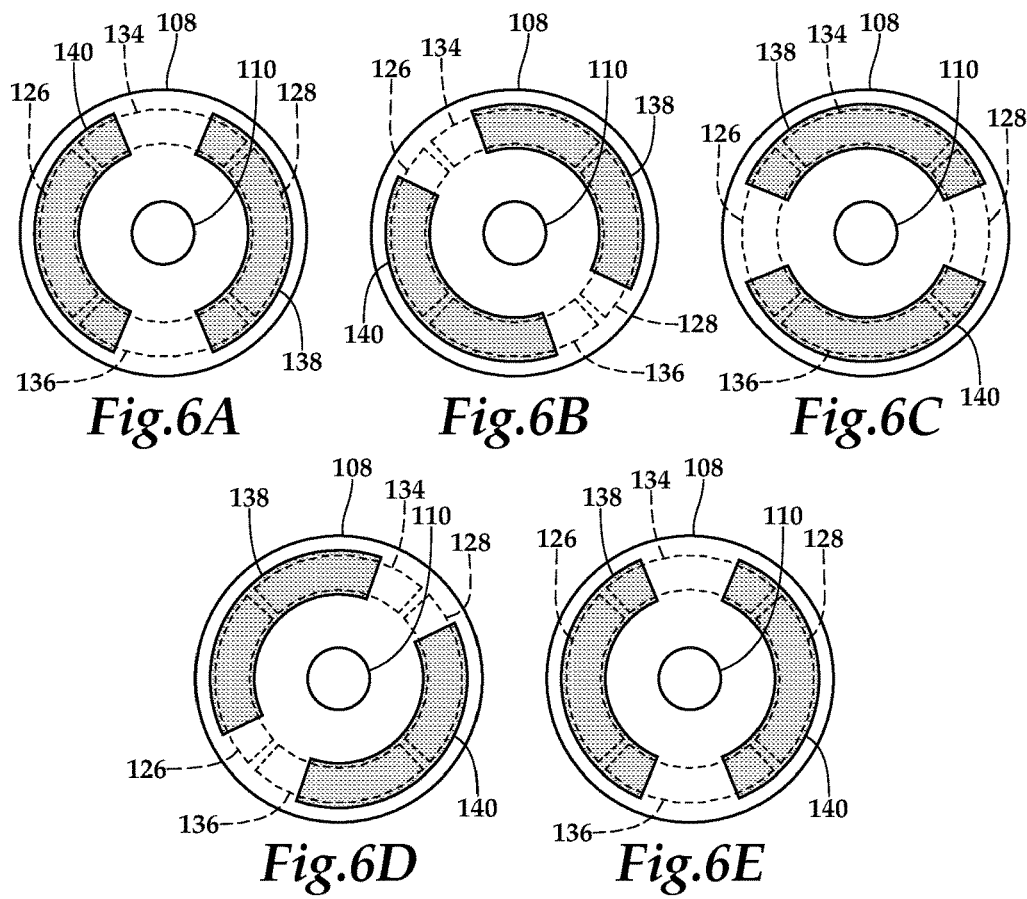
Fig.6A  Fig.6B  Fig.6C
Fig.6D  Fig.6E
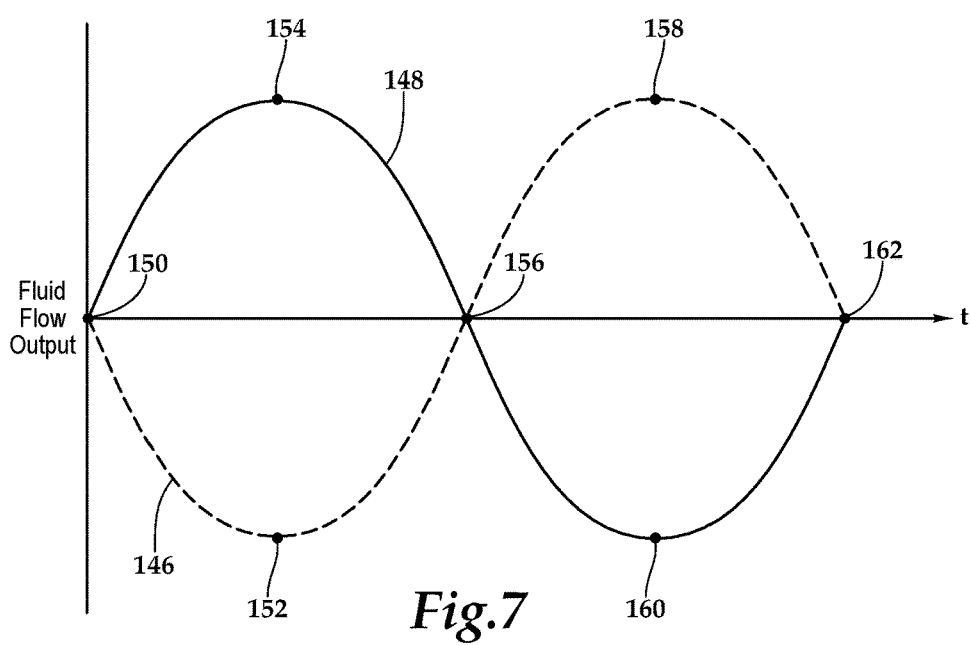
Fig.7

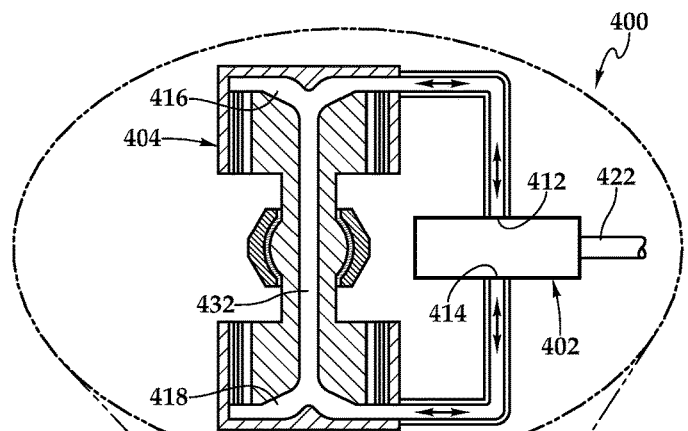
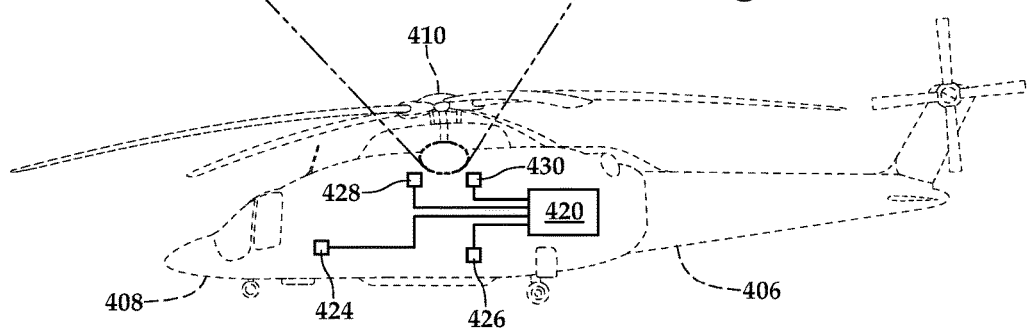
*Fig.10*
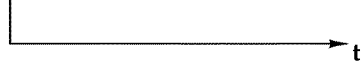
*Fig.11A*
*Fig.11B*
*Fig.11C*

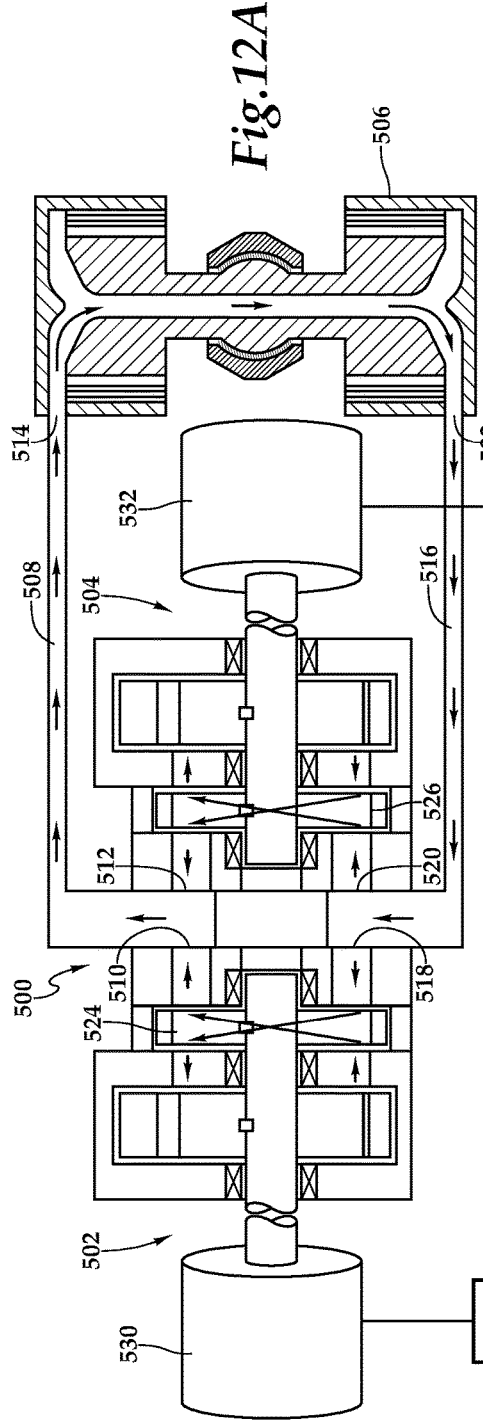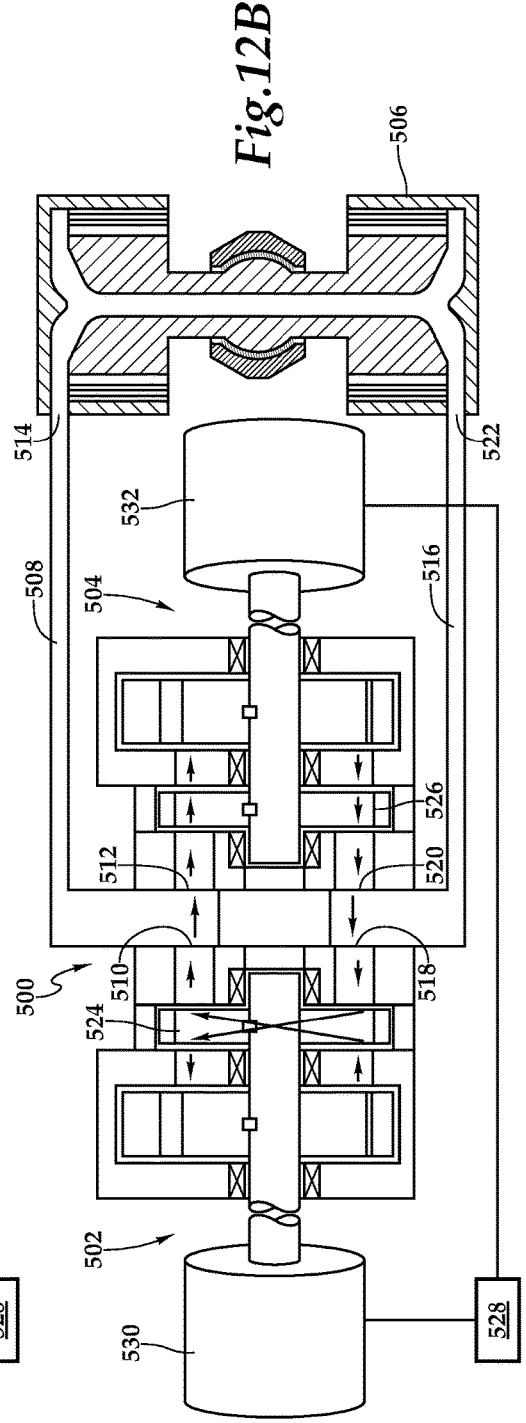

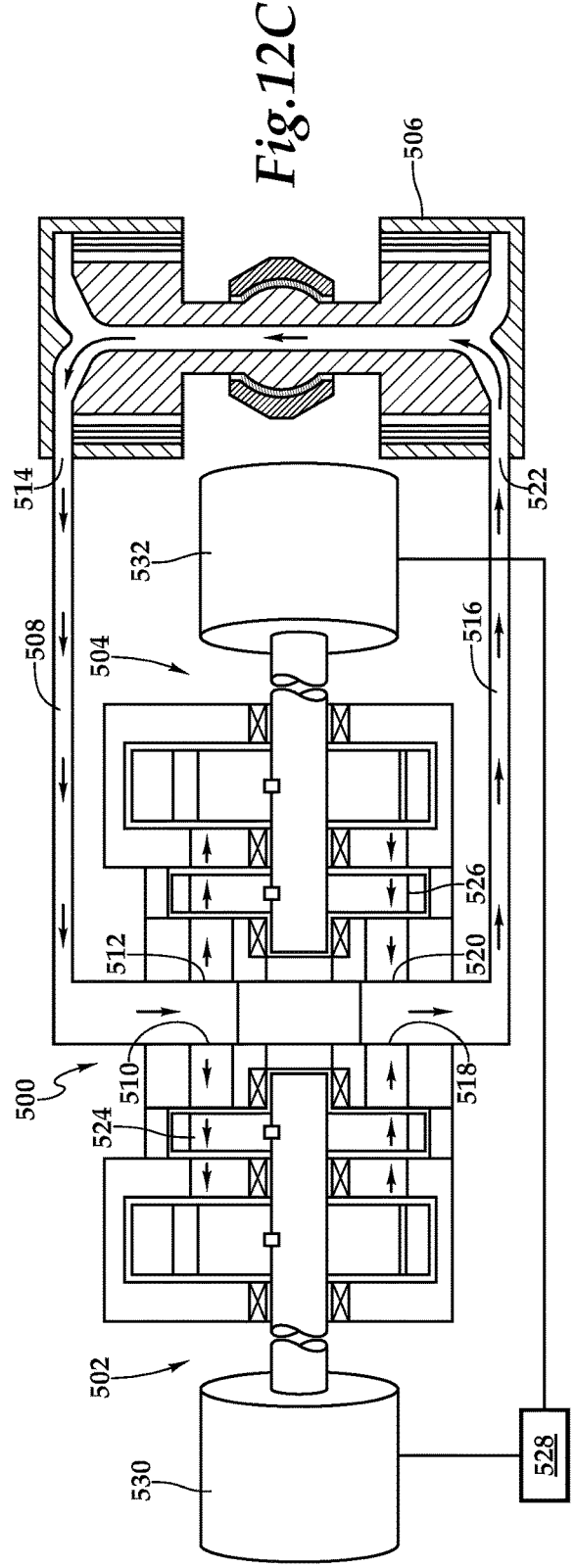

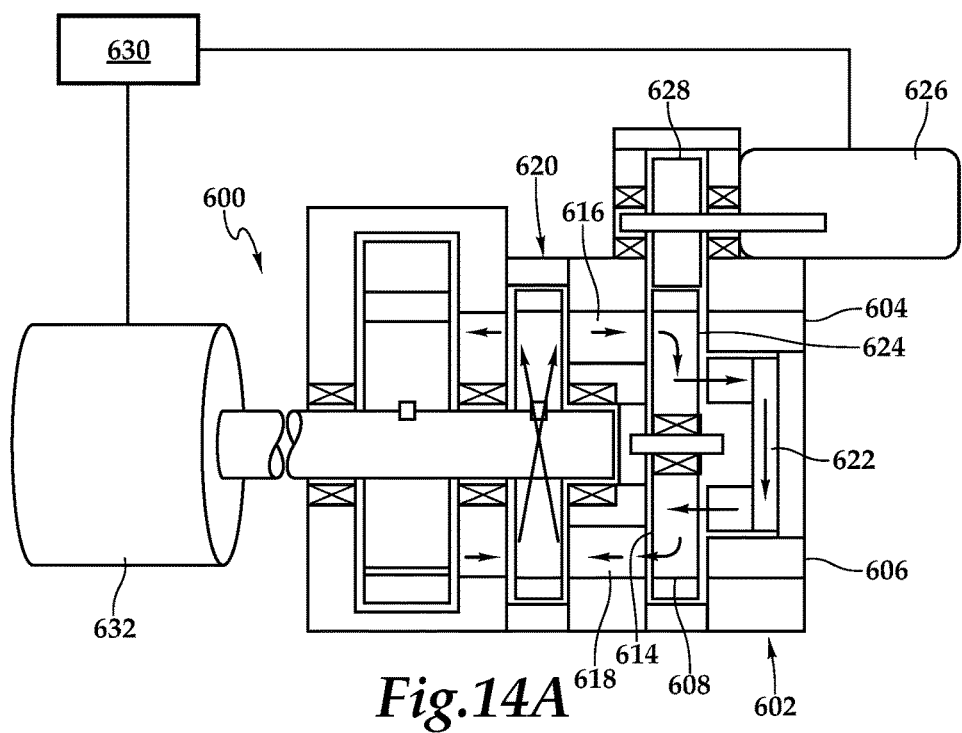
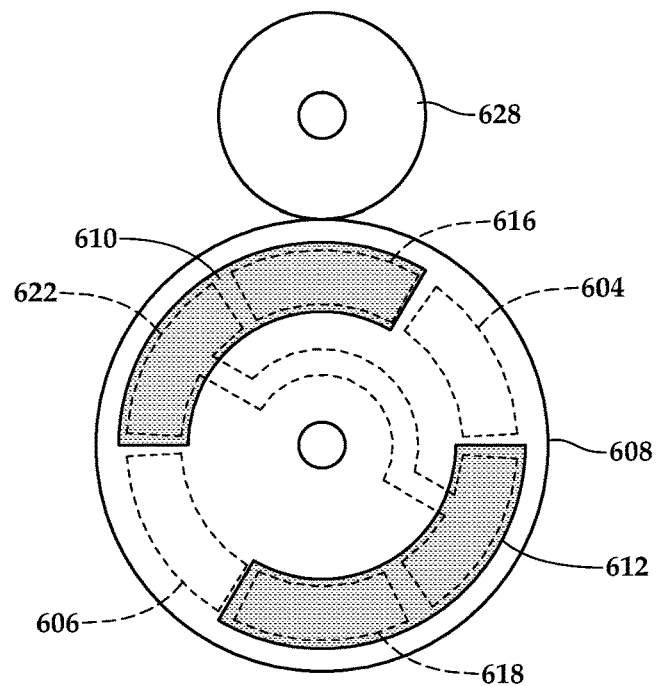
Fig.14A
Fig.14B

OSCILLATING PUMP SYSTEMS FOR USE ON AIRCRAFT

TECHNICAL FIELD OF THE DISCLOSURE

The present disclosure relates, in general, to oscillating pump systems for use on aircraft and, in particular, to oscillating pump systems capable of delivering oscillating fluid flow to aircraft components including vibration isolators.

BACKGROUND

Pumps are commonly used to supply fluid to various components of an aircraft. Some components of an aircraft may rely on oscillating fluid flow in which fluid changes direction in a back-and-forth, periodic fashion, analogous to alternating current in an electric circuit. One example of an aircraft component that may utilize oscillating fluid flow is a vibration isolator, which reduces vibration between two portions of the aircraft to which the vibration isolator is attached. A specific example of a vibration isolator is a Liquid Inertia Vibration Eliminator (LIVE™) unit that houses a piston having a tuning passage extending therethrough and that permits tuning fluid to flow between fluid chambers located at each end of the piston. The inertial force created by acceleration of the tuning fluid mass through the tuning passage cancels a force transmitted to the LIVE™ unit to reduce vibration between the portions of the aircraft to which the LIVE™ unit is attached. Previous attempts to augment oscillating fluid flow through a vibration isolator have suffered from limited displacements or force output, have required large pistons and heavy pumping devices or have been burdened with the inefficiency of converting rotational motion to translational motion. Accordingly, a need has arisen for a pump capable of providing oscillating fluid flow to components of an aircraft, such as a vibration isolator, while avoiding drawbacks of previous pumping techniques.

SUMMARY

In a first aspect, the present disclosure is directed to an oscillating pump system including a pump operable to circulate a fluid. The pump has a first port stage including an inlet port and an outlet port and a second port stage including a first oscillating port and a second oscillating port. An oscillator disk is disposed between the first port stage and the second port stage. The oscillator disk is rotatable relative to the inlet port, the outlet port, the first oscillating port and the second oscillating port. During rotation, the oscillator disk alternatingly routes the fluid to the inlet port from the first and second oscillating ports and alternatingly routes the fluid from the outlet port to the first and second oscillating ports, thereby generating oscillating fluid flow.

In some embodiments, the oscillator disk may be rotatable between a plurality of phases including a first phase, wherein the oscillator disk routes the fluid from the outlet port to the second oscillating port and from the first oscillating port to the inlet port and a second phase, wherein the oscillator disk routes the fluid from the outlet port to the first oscillating port and from the second oscillating port to the inlet port. In such embodiments, each quarter turn of the oscillator disk may change the phase of the oscillator disk between the first and second phases. In certain embodiments, the oscillating pump system may include a drive shaft operable to provide rotational energy to the pump and the oscillator disk, and a motor operable to provide rotational energy to the drive shaft. In such embodiments, the drive shaft may be operable to rotate in a single direction and drive the pump and the oscillator disk at the same rotational speed. Also in such embodiments, the oscillating pump system may oscillate the fluid at a frequency proportional to the rotational speed of the drive shaft. In certain embodiments, the pump may pump the fluid and the oscillator disk may alternatingly route the fluid in response to rotation of the drive shaft.

In some embodiments, the oscillator disk may include first and second slots to route the fluid therethrough. In such embodiments, the oscillator disk may be rotatable between a plurality of phases including a first phase, wherein the first slot routes the fluid from the first oscillating port to the inlet port and the second slot routes the fluid from the outlet port to the second oscillating port and a second phase, wherein the first slot routes the fluid from the outlet port to the first oscillating port and the second slot routes the fluid from the second oscillating port to the inlet port. In such embodiments, the first and second phases of the oscillator disk may be offset by less than or equal to 90 degrees. In certain embodiments, the plurality of phases may also include a third phase, wherein the first slot routes the fluid from the outlet port to the second oscillating port and the second slot routes the fluid from the first oscillating port to the inlet port and a fourth phase, wherein the first slot routes the fluid from the second oscillating port to the inlet port and the second slot routes the fluid from the outlet port to the first oscillating port. In some embodiments, each of the first and second slots may be sized to provide fluid communication between at least two of the first oscillating port, the second oscillating port, the outlet port of the pump or the inlet port of the pump. In certain embodiments, the pump may include a positive displacement pump such as a gerotor pump. In some embodiments, the oscillating pump system may generate sinusoidal oscillating fluid flow.

In certain embodiments, the oscillating pump may include a bypass fluid passage providing fluid communication between the first and second oscillating ports. In such embodiments, a fluid flow regulator may be operable to control fluid flow through the bypass fluid passage. In some embodiments, the oscillating pump system may include a bypass disk assembly including a bypass disk. The first and second oscillating ports may be adjacent to the first side of the bypass disk. The bypass disk may be rotatable between a first state and a second state. The bypass disk assembly may also include a bypass passage and first and second extension ports adjacent to the second side of the bypass disk. The bypass disk may route the fluid between the first oscillating port and the first extension port in the first state, as well as route the fluid between the second oscillating port and the second extension port in the first state. The bypass disk may route the fluid from the first and second oscillating ports to the bypass passage in the second state. In some embodiments, the bypass disk assembly may also include a motor operable to move the bypass disk between the first and second states. In certain embodiments, the bypass disk may further include first and second slots to route the fluid therethrough.

In a second aspect, the present disclosure is directed to a vibration isolation system including a vibration isolator operable to isolate vibration between at least two mechanical components. The vibration isolator has first and second fluid ports. A pump is operable to circulate a fluid, and has a first port stage including an inlet port and an outlet port and a second port stage including a first oscillating port and a second oscillating port. The first oscillating port is in fluid communication with the first fluid port of the vibration isolator, and the second oscillating port in fluid communication with the second fluid port of the vibration isolator. An oscillator disk is disposed between the first port stage and the second port stage, and is rotatable relative to the inlet port, the outlet port, the first oscillating port and the second oscillating port. During rotation, the oscillator disk alternatingly routes the fluid to the inlet port from the first and second oscillating ports, and alternatingly routes the fluid from the outlet port to the first and second oscillating ports, thereby generating oscillating fluid flow to the vibration isolator.

In some embodiments, the vibration isolator may include a Liquid Inertia Vibration Eliminator unit having a tuning passage disposed between the first and second fluid ports, and the fluid may include a tuning fluid moveable through the tuning passage to isolate vibration between at least two mechanical components. In certain embodiments, the vibration isolation system may include a first fluid passage providing fluid communication between the first oscillating port and the first fluid port of the vibration isolator, a second fluid passage providing fluid communication between the second oscillating port and the second fluid port of the vibration isolator, a bypass fluid passage providing fluid communication between the first and second fluid passages and a fluid flow regulation valve movable to control fluid flow through the bypass fluid passage, thereby regulating fluid flow to the vibration isolator via the first and second fluid passages.

In some embodiments, the vibration isolation system may include a second pump operable to circulate the fluid. The second pump may have a first port stage including an inlet port and an outlet port and a second port stage including a first oscillating port and a second oscillating port. The first oscillating port of the second pump may be in fluid communication with the first fluid port of the vibration isolator, and the second oscillating port of the second pump may be in fluid communication with the second fluid port of the vibration isolator. A second oscillator disk may be disposed between the first port stage and the second port stage of the second pump. The second oscillator disk may be rotatable relative to the inlet port, the outlet port, the first oscillating port and the second oscillating port of the second pump. During rotation, the second oscillator disk may alternatingly route the fluid to the inlet port of the second pump from the first and second oscillating ports of the second pump, and may alternatingly route the fluid from the outlet port of the second pump to the first and second oscillating ports of the second pump. The oscillator disk and the second oscillator disk may have a changeable phase relationship determining an amount of oscillating fluid flow delivered to the vibration isolator. In some embodiments, the oscillator disks may be positionable between a plurality of phase relationships including an in-phase relationship and an out-of-phase relationship. The oscillating pump systems may deliver oscillating fluid flow to the vibration isolator when the oscillator disks are in the in-phase relationship, and oscillating fluid flow may bypass the vibration isolator when the oscillator disks are in the out-of-phase relationship.

In certain embodiments, the at least two mechanical components may include a fuselage and a rotor hub assembly of a rotorcraft, and the vibration isolator may be operable to reduce vibration between the fuselage and the rotor hub assembly. In some embodiments, the vibration isolation system may include a fluid flow regulation valve fluidly interposed between the oscillating pump system and the vibration isolator, the fluid flow regulation valve movable to regulate fluid flow between the oscillating pump system and the vibration isolator.

In a third aspect, the present disclosure is directed to a rotorcraft including a fuselage, a rotor hub assembly rotatable relative to the fuselage and a vibration isolator disposed between the fuselage and the rotor hub assembly to isolate vibration therebetween. The vibration isolator has first and second fluid ports. A pump is operable to circulate a fluid, and has a first port stage including an inlet port and an outlet port and a second port stage including a first oscillating port and a second oscillating port. The first oscillating port is in fluid communication with the first fluid port of the vibration isolator, and the second oscillating port is in fluid communication with the second fluid port of the vibration isolator. An oscillator disk is disposed between the first port stage and the second port stage, and is rotatable relative to the inlet port, the outlet port, the first oscillating port and the second oscillating port. During rotation, the oscillator disk alternatingly routes the fluid to the inlet port from the first and second oscillating ports, and alternatingly routes the fluid from the outlet port to the first and second oscillating ports, thereby generating oscillating fluid flow to the vibration isolator.

In some embodiments, the rotorcraft may include a drive shaft operable to provide rotational energy to the pump and the oscillator disk, and the rotational speed of the drive shaft may be proportional to the rotational speed of the rotor hub assembly. In such embodiments, the rotor hub assembly may include a number of rotor blade assemblies, and the rotational speed of the drive shaft may be proportional to the rotational speed of the rotor hub assembly multiplied by the number of rotor blade assemblies. In certain embodiments, the rotorcraft may include at least one vibration sensor to detect a vibration of a portion of the rotorcraft to which the at least one vibration sensor is attached, as well as a controller in data communication with the at least one vibration sensor. In such embodiments, the controller may be operable to send a command to drive the pump and the oscillator disk to oscillate the fluid within the vibration isolator at a frequency to reduce the vibration detected by the at least one vibration sensor. In certain embodiments, the at least one vibration sensor may include an accelerometer, a strain gauge or a displacement sensor. In some embodiments, the rotor hub assembly may include a plurality of rotor blade assemblies rotatable at a blade pass frequency, and the pump may oscillate the fluid within the vibration isolator at the blade pass frequency.

In a fourth aspect, the present disclosure is directed to an oscillating pump system including a pump operable to move a fluid. The pump has a first port stage including an outlet port and a second port stage including a first oscillating port and a second oscillating port. An oscillator disk is disposed between the first port stage and the second port stage. The oscillator disk is rotatable relative to the outlet port, the first oscillating port and the second oscillating port. During rotation, the oscillator disk alternatingly routes the fluid from the outlet port to the first and second oscillating ports.

In a fifth aspect, the present disclosure is directed to a method of generating oscillating fluid flow from an oscillating pump system having a first port stage including an outlet port and a second port stage including a first oscillating port and a second oscillating port and an oscillator disk disposed between the first port stage and the second port stage. The method includes pumping a fluid to the outlet port; rotating the oscillator disk relative to the outlet port, the first oscillating port and the second oscillating port; and alternatingly routing the fluid from the outlet port to the first and second oscillating ports responsive to rotating the oscillator disk, thereby generating oscillating fluid flow.

In a sixth aspect, the present disclosure is directed to a method of generating oscillating fluid flow in a closed fluid system including an oscillating pump system having a first port stage including an inlet port and an outlet port and a second port stage including a first oscillating port and a second oscillating port and an oscillator disk disposed between the first port stage and the second port stage. The method includes circulating the fluid through the closed fluid system; rotating the oscillator disk relative to the inlet port, the outlet port, the first oscillating port and the second oscillating port; alternatingly routing the fluid to the inlet port from the first and second oscillating ports responsive to rotating the oscillator disk; and alternatingly routing the fluid from the outlet port to the first and second oscillating ports responsive to rotating the oscillator disk, thereby generating oscillating fluid flow.

In a seventh aspect, the present disclosure is directed to a method of generating oscillating fluid flow to a vibration isolator disposed within a closed fluid system including an oscillating pump system having a first port stage including an inlet port and an outlet port and a second port stage including a first oscillating port and a second oscillating port that are in fluid commutation with first and second port of the vibration isolator and an oscillator disk disposed between the first port stage and the second port stage. The method includes circulating the fluid through the closed fluid system; rotating the oscillator disk relative to the inlet port, the outlet port, the first oscillating port and the second oscillating port; alternatingly routing the fluid to the inlet port from the first and second oscillating ports responsive to rotating the oscillator disk; and alternatingly routing the fluid from the outlet port to the first and second oscillating ports responsive to rotating the oscillator disk, thereby generating oscillating fluid flow to the vibration isolator.

In an eighth aspect, the present disclosure is directed to a method of isolating vibration between two components of a rotorcraft having a vibration isolator disposed therebetween, the vibration isolator forming a portion of a closed fluid system including an oscillating pump system having a first port stage including an inlet port and an outlet port and a second port stage including a first oscillating port and a second oscillating port that are in fluid commutation with first and second port of the vibration isolator and an oscillator disk disposed between the first port stage and the second port stage. The method includes circulating the fluid through the closed fluid system; rotating the oscillator disk relative to the inlet port, the outlet port, the first oscillating port and the second oscillating port; alternatingly routing the fluid to the inlet port from the first and second oscillating ports responsive to rotating the oscillator disk; and alternatingly routing the fluid from the outlet port to the first and second oscillating ports responsive to rotating the oscillator disk, thereby generating oscillating fluid flow to the vibration isolator and isolating vibration between the two components.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which:

FIGS. 1A-1B are schematic illustrations of an exemplary rotorcraft utilizing an oscillating pump system in accordance with embodiments of the present disclosure;

FIGS. 4A-4C are various views of an oscillating pump system in accordance with embodiments of the present disclosure;

FIGS. 5A-5B are various views of an oscillating pump system in accordance with embodiments of the present disclosure;

FIGS. 6A-6E are cross-sectional views of an oscillator disk of an oscillating pump system having various phases in accordance with embodiments of the present disclosure;

FIG. 7 is a graph showing the fluid flow output of an oscillating pump system over time in accordance with embodiments of the present disclosure;

FIG. 10 is a schematic illustration of a vibration isolation system aboard a rotorcraft in accordance with embodiments of the present disclosure;

FIGS. 11A-11C are graphs showing a relationship between rotor speed, vibration frequency and drive shaft rotation speed in accordance with embodiments of the present disclosure;

FIGS. 12A-12C are side views of a vibration isolation system in accordance with embodiments of the present disclosure;

FIGS. 14A-14B are various views of an oscillating pump system having a bypass disk in a second state in accordance with embodiments of the present disclosure.

DETAILED DESCRIPTION

Figure 2:
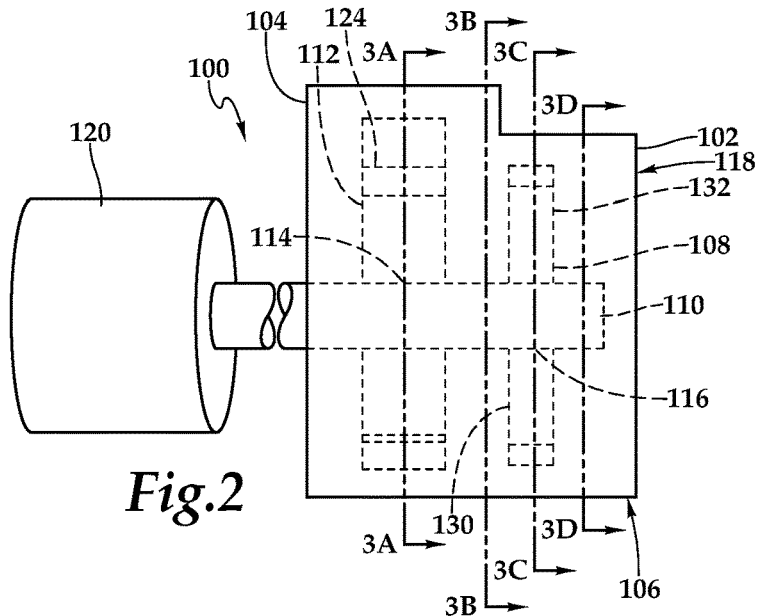
FIG. 2 is a side view of an oscillating pump system in accordance with embodiments of the present disclosure.
Figure 3A:
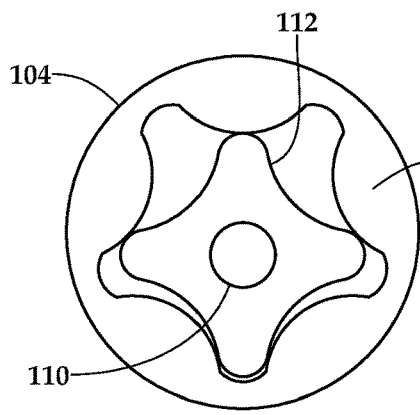
FIGS. 3A-3D are cross-sectional views of various components of the oscillating pump system shown in FIG. 2.
Figure 3B:
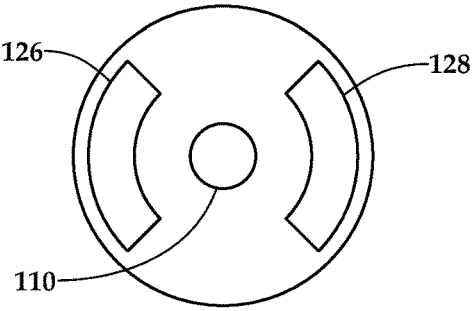
Figure 3C:
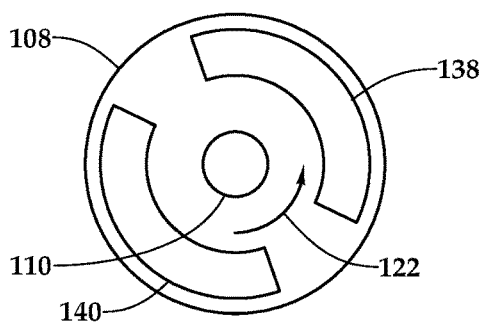
Figure 3D:
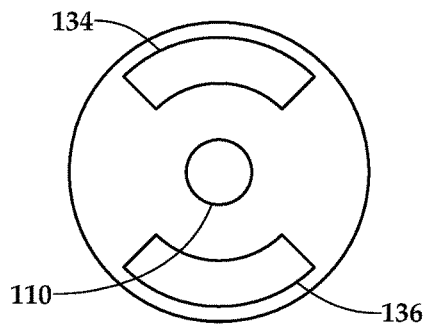

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Referring to FIGS. 1A and 1B in the drawings, a rotorcraft is schematically illustrated and generally designated 10. Rotorcraft 10 has a rotor hub assembly 12, which includes a plurality of rotor blade assemblies 14. Rotor hub assembly 12 is rotatable relative to a fuselage 16 of rotorcraft 10. The pitch of rotor blade assemblies 14 can be collectively and/or cyclically manipulated to selectively control direction, thrust and lift of rotorcraft 10. A landing gear system 18 provides ground support for rotorcraft 10. Rotor hub assembly 12 is supported atop rotorcraft 10 by a mast 20. Rotorcraft 10 also includes an oscillating pump system 22, which, in some embodiments, may provide an adjustable output of oscillating or harmonic fluid flow to a component 24 of rotorcraft 10. Component 24 may be any component of rotorcraft 10 capable of utilizing oscillating fluid flow. In one non-limiting example, component 24 may be a vibration isolator that reduces vibration between two portions of rotorcraft 10, such as rotor hub assembly 12 and fuselage 16, in which case oscillating pump system 22 and component 24 together form a vibration isolation system. Those having ordinary skill in the art with recognize that a rotorcraft may include any number of oscillating pump systems of the present disclosure to provide oscillating fluid flow to various components aboard a rotorcraft including, but not limited to, swashplate actuators to provide higher harmonic control of the rotor blades, actuators of an individual blade control system, cyclic blade control systems on a swashplateless rotor system and the like.

It should be appreciated that rotorcraft 10 is merely illustrative of a variety of aircraft that can implement the embodiments disclosed herein. Indeed, oscillating pump system 22 may be utilized on any aircraft capable of utilizing oscillating fluid flow. Other aircraft implementations can include hybrid aircraft, tiltrotor aircraft, tiltwing aircraft, quad tiltrotor aircraft, unmanned aircraft, gyrocopters, airplanes and the like. As such, those skilled in the art will recognize that oscillating pump system 22 can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2, 3A-3D, 4A-4C, 5A-5B, 6A-6E and 7, an oscillating pump system is schematically illustrated and generally designated 100. With particular reference to FIGS. 2 and 3A-3D, oscillating pump system 100 has a housing 102 that includes a pump 104. An oscillator disk assembly 106 includes an oscillator disk 108. Oscillating pump system 100 includes a drive shaft 110 at least partially within housing 102 that is operable to provide rotational energy to pump 104 and oscillator disk 108. Pump 104 includes an inner rotor 112 that is coupled to drive shaft 110 at a first station 114. Oscillator disk 108 is coupled to drive shaft 110 at a second station 116. As used herein, the term "coupled" may include direct or indirect coupling by any means, including moving and nonmoving mechanical connections. In the illustrated embodiment, second station 116 is nearer an input/output end 118 of oscillating pump system 100 than first station 114. Drive shaft 110 traverses the substantial center of both inner rotor 112 and oscillator disk 108. Rotational energy is transferred to drive shaft 110 by a motor 120. Drive shaft 110 rotates in a single direction 122 such that pump 104, via inner rotor 112, and oscillator disk 108 are driven in the same direction 122 and at the same rotational speed relative to one another, resulting in a state of phase lock. While pump 104 and oscillator disk 108 are driven at the same rotational speed, the rotational speed at which pump 104 and oscillator disk 108 are both driven may vary according to the amount of rotational energy provided by motor 120.

Pump 104 is a gerotor, or generated rotor, pump that has an outer rotor 124 and inner rotor 112. The flow rate of pump 104 varies in response to the rotation speed of the drive shaft 110. In other embodiments, pump 104 may be any type of pump capable of providing fluid flow to oscillator disk 108. For example, pump 104 may be any positive displacement pump capable of providing a substantially constant flow rate to oscillator disk 108. In other embodiments, pump 104 may be a piston pump or any rotary pump. In the illustrated embodiment, oscillating pump system 100 has a substantially steady or constant operating pressure.

Referring now to FIGS. 4A-4C and 5A-5B, pump 104 and oscillator disk 108 are rotatable to produce oscillating and harmonic fluid flow via a number of ports. In particular, pump 104 includes an outlet port 126 through which fluid is outputted. Pump 104 also includes an inlet port 128 through which pump 104 receives fluid. Outlet port 126 and inlet port 128 form a first port stage 129. Outlet port 126 and inlet port 128 are adjacent to a first side 130 of oscillator disk 108. A second, opposite side 132 of oscillator disk 108 is adjacent to first and second oscillating ports 134, 136, through which oscillating fluid flow may be transmitted. First and second oscillating ports 134, 136 form a second port stage 137. Oscillator disk 108 is disposed between first port stage 129 and second port stage 137, and is rotatable relative to outlet port 126, inlet port 128, first oscillating port 134 and second oscillating port 136. Oscillator disk 108 includes first and second slots 138, 140 that alternately route fluid to first and second oscillating ports 134, 136 from outlet port 126, as well as alternately route fluid from first and second oscillating ports 134, 136 to inlet port 128, in response to the rotation of oscillator disk 108.

In operation, when drive shaft 110 is rotated at a constant speed, pump 104 produces a steady flow of fluid to outlet port 126. First and second slots 138, 140 route fluid into inlet port 128 and away from output port 126 throughout the rotation cycle of oscillator disk 108. Depending upon the rotational orientation, or phase, of oscillator disk 108, first and second slots 138, 140 alternately route fluid to either the first or second oscillating port 134, 136 from outlet port 126 and alternately route fluid to inlet port 128 from either first or second oscillating port 134, 136. Thus, as oscillator disk 108 is rotated by drive shaft 110, the flow of fluid from outlet port 126 alternates between being routed to the first and second oscillating ports 134, 136 in a harmonic fashion. Similarly, fluid flow into inlet port 128 alternates between originating from first or second oscillating ports 134, 136 in an oppositely-phased harmonic fashion. In this manner, pump 104 pumps fluid and oscillator disk 108 alternately routes fluid in response to drive shaft 110 rotating to generate oscillating fluid flow. The oscillation frequency, or cycles per second, of fluid flow at first and second oscillating ports 134, 136 is directly related and/or proportional to the rotational speed of drive shaft 110.

Oscillator disk 108 is rotatable into an infinite number of rotational phases during each revolution, two of which are shown in FIGS. 4C and 5B. The phases of oscillator disk 108 shown in FIGS. 4C and 5B are offset from one another by 90 degrees, or one quarter turn. Oscillator disk 108 alternatingly routes fluid to either the first or second oscillating port 134, 136 from outlet port 126 by routing fluid from outlet port 126 to second oscillating port 136 in the phase shown in FIG. 4C, as indicated by fluid flow arrows 142a in FIG. 4A, and routing fluid from outlet port 126 to first oscillating port 134 in the phase shown in FIG. 5B, as indicated by fluid flow arrows 144a in FIG. 5A. Oscillator disk 108 also alternatingly routes fluid from either first or second oscillating port 134, 136 to inlet port 128 by routing fluid from first oscillating port 134 to inlet port 128 in the phase shown in FIG. 4C, as indicated by fluid flow arrows 142b in FIG. 4A, and routing fluid from second oscillating port 136 to inlet port 128 in the phase shown in FIG. 5B, as indicated by fluid flow arrows 144b in FIG. 5A. The two illustrated phases of oscillator disk 108 continue to alternate between one another with each quarter turn of oscillator disk 108, thereby generating oscillating and harmonic fluid flow best seen with reference to fluid flow arrows 142a, 142b, 144a, 144b in FIGS. 4A and 5A.

Routing a fluid through oscillator disk 108 is accomplished via first and second slots 138, 140, which alternatingly route fluid based upon the phase in which oscillator disk 108 is situated at a particular time. In the phase shown in FIG. 4C, first slot 138 routes fluid from first oscillating port 134 to inlet port 128 and second slot 140 routes fluid from outlet port 126 to second oscillating port 136. In the second phase shown in FIG. 5B, first slot 138 routes fluid from outlet port 126 to first oscillating port 134 and second slot 140 routes fluid from second oscillating port 136 to inlet port 128. If oscillator disk 108, as shown in FIG. 5B, rotates another quarter turn, the phase of oscillator disk 108 would appear as shown in FIG. 4C except that first and second slots 138, 140 would exchange positions and first slot 138 would route fluid from outlet port 126 to second oscillating port 136 while second slot 140 routes fluid from first oscillating port 134 to inlet port 128. If oscillator disk 108 rotates yet another quarter turn, oscillator disk 108 would appear as shown in FIG. 5B except that first and second slots 138, 140 would exchange positions, and first slot 138 would route fluid from second oscillating port 136 to inlet port 128 while second slot 140 routes fluid from outlet port 126 to first oscillating port 134. Each of the phases described in relation to FIGS. 4C and 5B may be offset by 90 degrees or less. As mentioned above, oscillator disk 108 is rotatable into an infinite number of phases during each revolution, most of which are intermediate to the phases described in relation to FIGS. 4C and 5B, such that each slot 138, 140 emits oscillating fluid flow having a fluid flow output over time like that shown in FIG. 7.

In the illustrated embodiment, first and second slots 138, 140 are each sized to provide fluid communication between at least two of first oscillating port 134, second oscillating port 136, outlet port 126 or inlet port 128. First and second slots 138, 140 are substantially the same size and shape to cause the oscillating fluid flow through first and second oscillating ports 134, 136 to be symmetric, as shown in FIG. 7. In other embodiments, however, first and second slots 138, 140 may be sized or shaped differently from one another to create oscillating fluid flow through first and second oscillating ports 134, 136 that is asymmetric. Because pump 104 and oscillator disk 108 are both coupled to the same drive shaft 110, the fluid flow generated by pump 104 is proportional to the oscillation frequency generated by oscillator disk 108. In other embodiments, however, pump 104 and oscillator disk 108 may each be coupled to separate drive shafts so that the fluid flow generated by pump 104 and the oscillation frequency generated by oscillator disk 108 may be varied independently from one another. While drive shaft 110 is shown to be rotated by motor 120, in other embodiments drive shaft 110 may be coupled to a rotating portion of an aircraft, such as a mast or drivetrain, via one or more gears such that the rotating portion of the aircraft provides rotational energy to the drive shaft 110.

Drive shaft 110, pump 104 and oscillator disk 108 move in the same rotational direction at the same rotational speed relative to one another, thereby providing power efficiency and reducing the overall size and weight of oscillating pump system 100 due to the decreased complexity of fewer parts. Oscillating pump system 100 avoids converting rotary motion to translational motion, and is not required to repeatedly reverse the direction of motor 120. Thus, oscillating pump system 100 need not overcome large inertia forces associated with motor or piston assembly direction reversals and corresponding accelerations. Because motor 120 rotates in a single direction, the inherent rotational inertia of motor 120 advantageously assists with overcoming forces associated with fluid pressure oscillations.

FIGS. 6A-6E and 7 show the fluid flow output of oscillating ports 134, 136 as oscillator disk 108 rotates. In particular, the fluid flow output of oscillating ports 134, 136 approximate a sinusoidal and harmonic oscillation, which is useful in reducing vibrations on aircraft that have sinusoidal tendencies. In FIG. 7, the fluid flow output of first oscillating port 134 is represented by dotted line 146 and the fluid flow output of second oscillating port 136 is represented by line 148. The oscillation frequency of the fluid flow output of both first and second oscillating ports 134, 136 may be varied by changing the rotational speed of drive shaft 110. The phase of oscillator disk 108 in FIG. 6A corresponds to first and second oscillating ports 134, 136 each having a fluid flow output of substantially zero, as indicated by point 150 in FIG. 7. In FIG. 6A, the net fluid flow output of both first and second oscillating ports 134, 136 is substantially zero due to each of first and second oscillating ports 134, 136 being fluidly connected, simultaneously and in substantially equal measure, to input and output ports 126, 128. In FIG. 6B the fluid flow output of first oscillating port 134 has a negative value at point 152 in FIG. 7, indicating that first oscillating port 134 is receiving, as opposed to outputting, fluid. At point 152, the amount of fluid that first oscillating port 134 transmits to inlet port 128 is at a maximum. Conversely, the fluid flow output of second oscillating port 136 has a maximum positive value, as indicated by point 154 in FIG. 7. At point 154, the amount of fluid transmitted from outlet port 126 to second oscillating port 136 is at a maximum.

In FIG. 6C, first and second oscillating ports 134, 136 are each fluidly connected to outlet and inlet ports 126, 128, simultaneously and in substantially equal measure, such that the fluid flow output of both first and second oscillating ports 134, 136 is substantially zero, as indicated by point 156 in FIG. 7. The phase of oscillator disk 108 in FIG. 6D causes the fluid flow output of first oscillating port 134 to have a maximum positive value, as indicated by point 158 in FIG. 7, while the fluid flow output of second oscillating port 136 has a maximum negative value, as indicated by point 160 in FIG. 7. Thus, in the quarter turn between the phases shown in FIGS. 6B and 6D, the fluid flow output of first and second oscillating ports 134, 136 each change from having minimum to maximum values, or vice versa. Finally, in FIG. 6E the phase of oscillator disk 108 is 180 degrees from that shown in FIG. 6A to cause first and second oscillating ports 134, 136 to each have substantially zero fluid flow output, as indicated by point 162 in FIG. 7. The sinusoidal oscillation of fluid flow through first and second oscillating ports 134, 136 may be extrapolated in time beyond that which is shown in FIG. 7 as oscillator disk 108 continues to rotate in the same direction 122 beyond that which is shown in FIG. 6E. Also, the oscillation of fluid flow through first and second oscillating ports 134, 136 may have non-sinusoidal oscillation patterns depending on the application.

Figure 8:
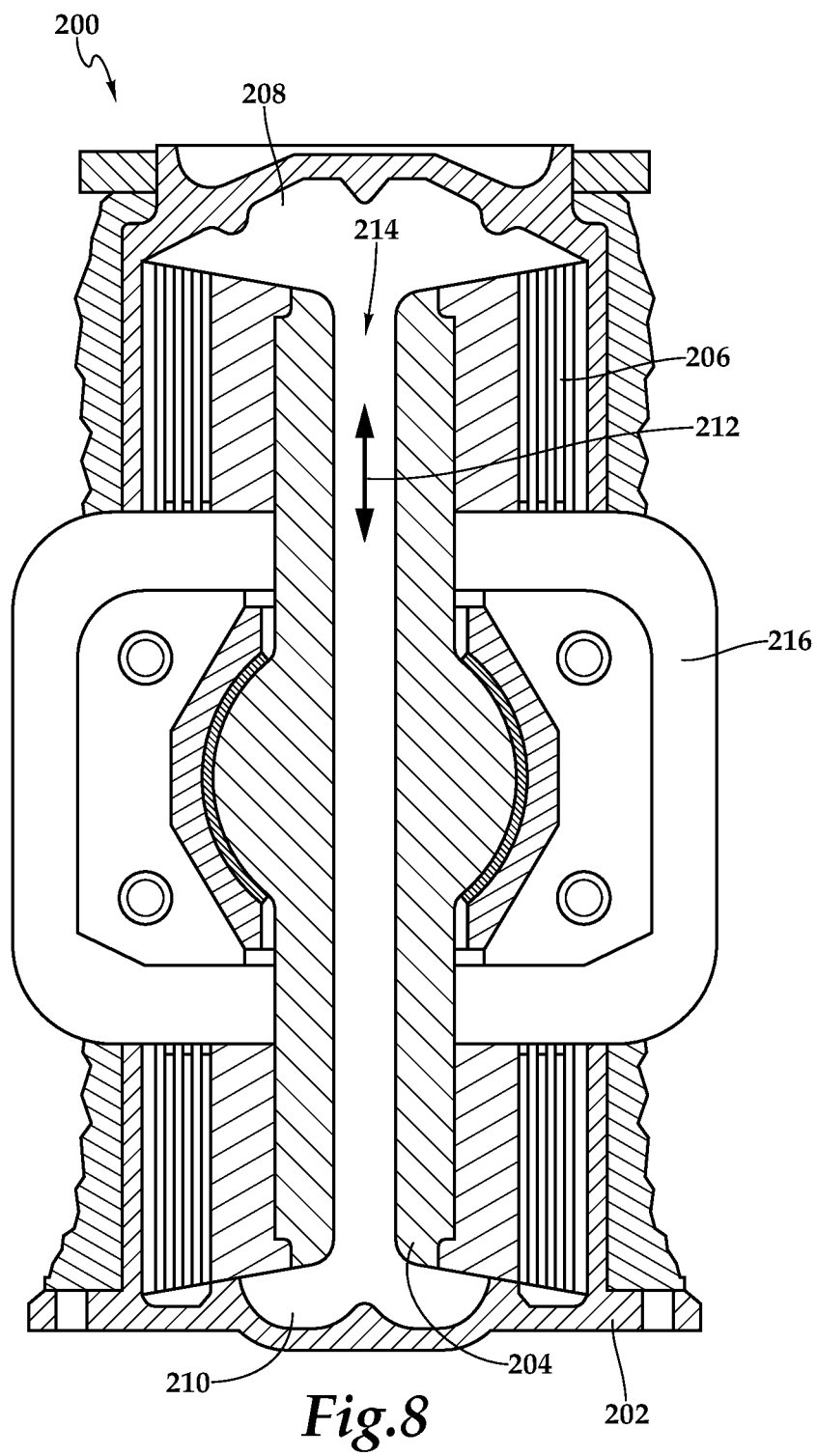
FIG. 8 is a cross-sectional view of a vibration isolator in accordance with embodiments of the present disclosure.

Referring to FIG. 8 in the drawings, a vibration isolator is schematically illustrated and generally designated 200. Vibration isolator 200 attenuates, isolates or otherwise reduces transfer of vibration, such as periodic vibration, between two or more mechanical components or bodies. Vibration isolator 200 can be implemented in aircraft such as rotorcraft to isolate a fuselage or other portion of an aircraft from mechanical and/or harmonic vibrations associated with propulsion system components, such as a rotor hub assembly, engine, transmission, gearbox, propeller or the like. Reducing such vibration improves avionics, passenger comfort and electronic component longevity. Examples of rotorcraft vibrations of concern include a blade pass frequency and higher harmonics, among others.

In the illustrated embodiment, vibration isolator 200 is a Liquid Inertia Vibration Eliminator (LIVE™) unit. LIVE™ units are vibration-canceling throughput units and can take many forms. Vibration isolator 200 includes a housing 202 that has a hollow, generally cylindrical interior. A piston 204 of a selected cross-sectional diameter is disposed within the interior of housing 202. Elastomeric seal and spring members 206 resiliently seal piston 204 within the interior of housing 202. A first fluid chamber 208 and a second fluid chamber 210 are defined by the interior of housing 202 and piston 204 and are sealed against leakage by elastomeric seal and spring members 206. Tuning fluid, which may be a high density and low viscosity fluid, is disposed within fluid chambers 208, 210. In addition to sealing the tuning fluid and fluid chambers 208, 210, elastomeric seal and spring members 206 function as a spring to permit piston 204 to move or oscillate in a longitudinal direction indicated by double arrow 212, relative to housing 202, while maintaining piston 204 in a central location in housing 202 when no load is applied. A tuning passage 214 extends centrally through piston 204 and permits the tuning fluid to flow between first fluid chamber 208 and second fluid chamber 210.

When reducing vibration between two bodies, a first body may be attached to piston 204 via bracket 216, and a second body may be attached to housing 202. In operation, the introduction of a force to bracket 216 displaces piston 204 relative to housing 202 along double arrow 212. Because the force and displacement is oscillatory over time, piston 204 similarly oscillates relative to housing 202. A displacement of piston 204 causes a displacement of tuning fluid through tuning passage 214 in the opposite direction of the displacement of piston 204. The displacement of piston 204 causes an oscillatory reaction force due to strain and elastomeric seal and spring members 206. At the same time, the volumes of tuning fluid in first and second fluid chambers 208, 210 are alternately increased and decreased such that the tuning fluid is pumped back and forth through tuning passage 214. The inertial force created by acceleration of the mass of the tuning fluid is out of phase with the force introduced to piston 204 via bracket 216. At an isolation frequency, the force of the mass of the tuning fluid cancels the force introduced to piston 204 via bracket 216.

Vibration isolator 200 is a passive vibration isolator. Passive vibration isolators are effective only at or near a single vibration frequency, and are unable to isolate vibrations that occur at multiple frequencies as may occur when a rotorcraft operates at different rotor speeds. In contrast, an active vibration isolation system can be effective over a range of frequencies to accommodate more than just a single isolation frequency. The oscillating pump systems of the illustrative embodiments may be part of an active vibration isolation system by providing oscillating and harmonic fluid flow to a vibration isolator. The dynamic response characteristics of an active vibration isolation system can be altered as desired. Active vibration isolation systems may include active adjustment of the isolation frequency and the frequency response characteristics of a vibration isolator. For example, a pressure differential in a LIVE™ unit can be actively adjusted to affect the isolation frequency and frequency response characteristics of the vibration isolator. It will be appreciated by one of ordinary skill in the art that any number of vibration isolators, such as vibration isolator 200, may be utilized in a particular rotorcraft.

Previously, active pumper devices have used piezoelectric or electromagnetic actuation within the LIVE™ unit to oscillate tuning fluid through tuning passage 214 by mechanically activating piston 204. However, such active pumper devices have drawbacks. Piezoelectric-actuated pumper devices typically produce small displacements and require large pistons and heavy pumping devices to deliver the required power. Electromagnetic-actuated pumper devices, while not displacement limited, can have limited force output. Such pumper devices may also be large and heavy to produce the required power. In addition, an electromagnetic pump device, which uses an electric motor to oscillate piston 204 and dynamically displace the tuning fluid, generates a sinusoidal displacement output. The electric motor speed and sinusoidal displacement amplitude are controlled to produce the desired quantity of pumped fluid and the frequency of fluid oscillations. To produce the harmonic displacement output, the electric motor must repeatedly reverse directions in a periodic fashion, resulting in large accelerations. Thus, the electric motor must generate large forces or torque to overcome the inertia of the motor or piston assembly. Additionally, the motor must overcome the forces associated with the differential fluid pressure across piston 204. More recently, oscillating pumps external to the LIVE™ unit have been used to introduce oscillating fluid flow to tuning passage 214 of piston 204. Such external oscillating pumps, however, are burdened with converting rotational motion to translational motion using a combination of one or more electric drive motors, slider cranks, cam followers and scotch yokes, increasing the complexity of such pumps.

Figure 9A:
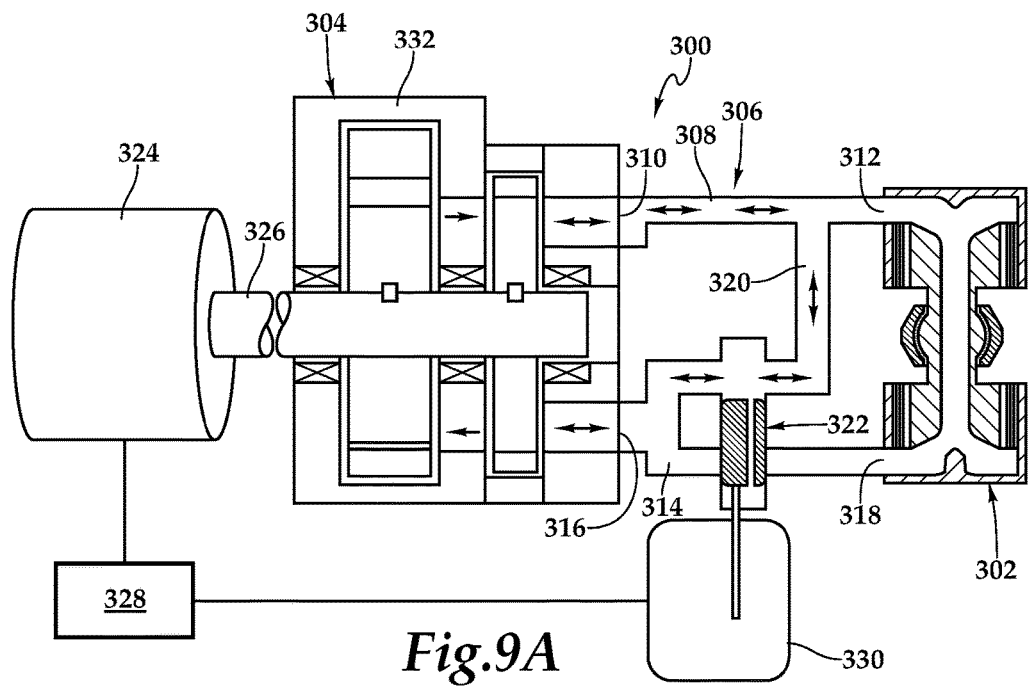
FIGS. 9A-9B are side views of a vibration isolation system in accordance with embodiments of the present disclosure.
Figure 9B:
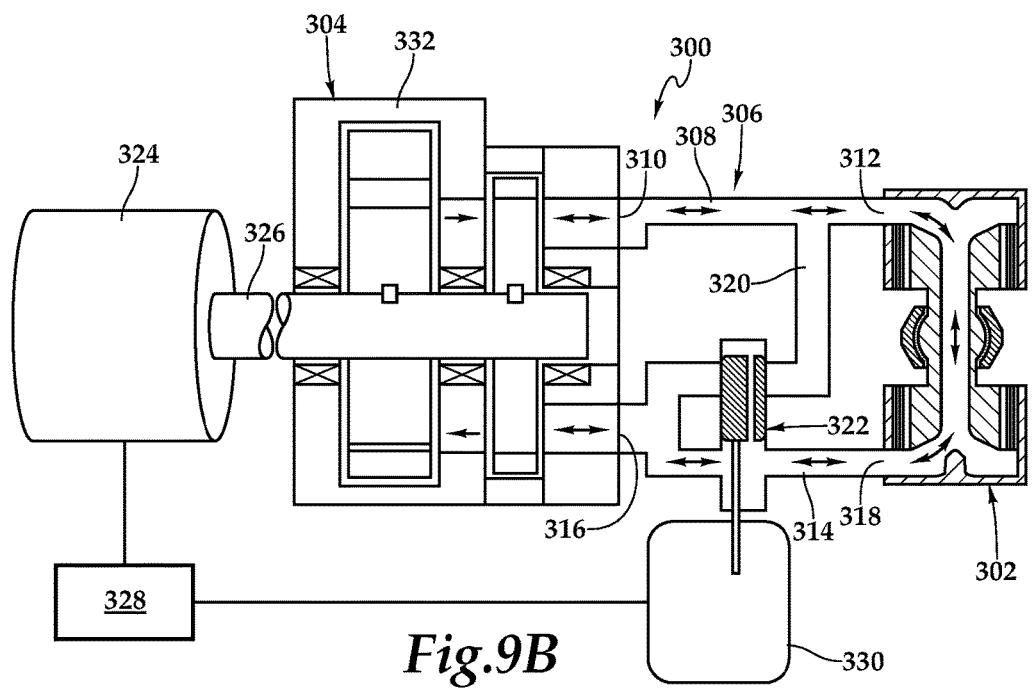

Referring to FIGS. 9A-9B in the drawings, a vibration isolation system is schematically illustrated and generally designated 300. Vibration isolation system 300 includes vibration isolator 302, which is adapted to receive an oscillating fluid to reduce vibration between at least two portions of an aircraft. Vibration isolation system 300 is an active vibration isolation system. In the illustrated embodiment, vibration isolator 302 is a LIVE™ unit, and is in fluid communication with oscillating pump system 304. Oscillating pump system 304 generates oscillating fluid flow at various oscillation frequencies to vibration isolator 302 to allow vibration isolator 302 to reduce vibration between two bodies at various vibrational frequencies. Vibration isolation system 300 includes a fluid flow regulation assembly 306 that regulates fluid flow between oscillating pump system 304 and vibration isolator 302. Fluid flow regulation assembly 306 includes a first fluid passage 308 that provides fluid communication between first oscillating port 310 of oscillating pump system 304 and a first vibration isolator fluid port 312. Fluid flow regulation assembly 306 also includes a second fluid passage 314 that provides fluid communication between second oscillating port 316 of oscillating pump system 304 and second vibration isolator fluid port 318. Fluid flow regulation assembly 306 also includes a bypass fluid passage 320 that provides fluid communication between first and second fluid passages 308, 314.

A fluid flow regulation valve 322 is fluidly interposed between oscillating pump system 304 and vibration isolator 302, and is movable to regulate fluid flow between oscillating pump system 304 and vibration isolator 302. In particular, fluid flow regulation valve 322 is movable to control fluid flow through bypass fluid passage 320, thereby regulating fluid flow to vibration isolator 302 via first and second fluid passages 308, 314. In FIG. 9A, fluid flow regulation valve 322 is positioned outside of bypass fluid passage 320 and inside second fluid passage 314 to allow fluid to pass through bypass fluid passage 320 unobstructed, which causes fluid to freely move between first and second fluid passages 308, 314 so that vibration isolator 302 is bypassed. In FIG. 9A, all (100%) oscillating fluid flow is pumped through bypass fluid passage 320. In FIG. 9B, fluid flow regulation valve 322 obstructs bypass fluid passage 320 so that oscillating fluid flow is transmitted to vibration isolator 302 from oscillating pump system 304 via first and second fluid passages 308, 314. In FIG. 9B, all (100%) oscillating fluid flow is pumped through vibration isolator 302. Fluid flow regulation valve 322 is movable into an infinite number of positions so that anywhere from 0-100% of the fluid pumped by oscillating pump system 304 may be delivered to vibration isolator 302. Fluid flow regulation valve 322 allows the volume of fluid transmitted to vibration isolator 302 to be varied independently from the oscillation frequency of oscillating pump system 304, the latter being controlled by the rotational speed of motor 324 and drive shaft 326. The rotational speed of motor 324 and drive shaft 326 and the position of fluid flow regulation valve 322 may be controlled by a controller 328. A valve motor 330 may change the position of fluid flow regulation valve 322 based on commands from controller 328.

The size of pump 332 may be determined based on the quantity of fluid required to be oscillated through vibration isolator 302. In some embodiments, pump 332 may be sized such that even when the minimum oscillation frequency is required of oscillating pump system 304, pump 332 is still able to output an adequate amount of fluid. It will be appreciated by one of ordinary skill in the art that fluid flow regulation valve 322 is but one example of a regulation valve that may be used to control the flow or volume of fluid being transmitted from oscillating pump system 304 to vibration isolator 302. Also, while vibration isolation system 300 is shown to include a LIVE™ unit, other types of vibration isolators may be utilized in conjunction with oscillating pump system 304, and oscillating pump system 304 may be utilized on any aircraft that incorporates pylon vibration isolation, among other environments.

Referring to FIGS. 10 and 11A-11C in the drawings, a vibration isolation system mounted on a rotorcraft is schematically illustrated and generally designated 400. Vibration isolation system 400 may include a fluid flow regulation assembly as described in FIGS. 9A-9B. Vibration isolation system 400 includes an oscillating pump system 402 fluidly coupled to a vibration isolator 404. In the illustrated embodiment, vibration isolator 404 is a LIVE™ unit that, together with oscillating pump system 402, forms an active pylon mount, or APM, system for vibration isolation. While vibration isolation system 400 may be used to reduce vibration between any two portions of rotorcraft 406, in the illustrated embodiment vibration isolation system 400 reduces vibration between fuselage 408 and rotor hub assembly 410. Oscillating ports 412, 414 of oscillating pump system 402 are connected to upper and lower fluid chambers 416, 418 of vibration isolator 404, respectively. Oscillating pump system 402 provides a controllable tuning fluid oscillation in addition to the fluid flow induced by vibration across the vibration isolator 404.

A controller 420 may send a command signal to oscillating pump system 402 by controlling the output of an electric motor that rotates drive shaft 422 to minimize the vibration transmitted from rotor hub assembly 410 to fuselage 408. In doing so, controller 420 utilizes vibration sensors 424, 426, 428, 430 installed in the pylon mount attachments and other fuselage locations. Vibration sensors 424, 426, 428, 430 each detect vibration of the portion of rotorcraft 406 to which it is attached. Controller 420 is in data communication with vibration sensors 424, 426, 428, 430 and may be operable to send a command signal to drive the pump and oscillator disk of oscillating pump system 402, via drive shaft 422, to reduce the vibration detected by all or a portion of vibration sensors 424, 426, 428, 430. In some embodiments, vibration sensors 424, 426, 428, 430 may be located anywhere on fuselage 408 so that fuselage vibration may be detected and minimized by vibration isolation system 400. Each vibration sensor 424, 426, 428, 430 may be an accelerometer, strain gauge, displacement sensor or any other device capable of detecting vibration or movement.

In other embodiments, vibration sensors 424, 426 may be located on fuselage 408, and vibration sensors 428, 430 may be located at or near rotor hub assembly 410 to detect the vibration of rotor hub assembly 410. Upon detecting the vibration frequency of rotor hub assembly 410 using vibration sensors 428, 430, controller 420 may command oscillating pump system 402 to pump tuning fluid through vibration isolator 404 at an appropriate volume and oscillation frequency to isolate the vibration of rotor hub assembly 410 from fuselage 408, thereby causing vibration sensors 424, 426 to detect a vibration in fuselage 408 that has been reduced to as close to zero as possible. Thus, controller 420 may send command signals to oscillating pump system 402 to generate an oscillating fluid output in a manner that minimizes the response of vibration sensors 424, 426. In yet other embodiments, a pressure sensor may be deployed at or near vibration isolator 404 to detect a pressure of the tuning fluid, which may be used by controller 420 to determine an optimal oscillation frequency at which to oscillate tuning fluid through tuning passage 432 to reduce vibration between rotor hub assembly 410 and fuselage 408.

Vibration isolation system 400 provides controllable tuning fluid isolation by oscillating pump system 402 for vibration isolator 404 by dynamically displacing the tuning fluid between upper and lower fluid chambers 416, 418. Suitable vibration isolation may be achieved by overcoming fluid damping losses within the vibration isolator, and by adjusting the vibration isolator mount frequency response characteristics. Thus, vibration transmission to fuselage 408 may be minimized, and optimal vibration isolation can be achieved for a wide range of rotational speeds, or RPMs, of rotor hub assembly 410. In addition, by utilizing a fluid flow regulation assembly or other bypass mechanism described in the illustrative embodiments, the fluid displaced by oscillating pump system 402 is either directed towards vibration isolator 404, directed to a bypass fluid passage that bypasses vibration isolator 404 or directed to both vibration isolator 404 and a bypass fluid passage in a suitable proportion. The quantity of fluid directed towards vibration isolator 404 can be regulated by controlling the proportion of fluid directed to the bypass fluid passage. Oscillating pump system 402 is commanded by controller 420 so that oscillating pump system 402 provides a regulated amount of additional tuning fluid oscillation into upper and lower fluid chambers 416, 418 of vibration isolator 404. The power required by the illustrative embodiments may be significantly less than that required by previous pumping devices. The weight of vibration isolation system 400 may also be minimized by the utilization of oscillating pump system 402. The illustrative embodiments also provide an efficient, lightweight and smaller design for augmenting LIVE™ unit technology and creating an active pylon vibration isolation system.

Rotor speed graph 434, vibration frequency graph 436 and drive shaft rotation speed graph 438 in FIGS. 11A-11C illustrate that the oscillation frequency of the tuning fluid through vibration isolator 404, as controlled by drive shaft 422, changes as the rotational speed of rotor hub assembly 410 changes to accommodate a different vibrational frequency emitted by rotor hub assembly 410. In one implementation, as the rotor speed of rotor hub assembly 410 decreases, as shown in rotor speed graph 434, the vibration frequency of rotor hub assembly 410 also decreases, as shown in vibration frequency graph 436. In response, controller 420 commands the rotation speed of drive shaft 422 to decrease, as shown in drive shaft rotation speed graph 438, to counteract the lowered vibration frequency emitted by rotor hub assembly 410. In another implementation, the converse relation is true if the rotational speed of rotor hub assembly 410 increases. Thus, the rotational speed of drive shaft 422 may be proportional to the rotational speed of rotor hub assembly 410.

In some embodiments, the rotational speed of drive shaft 422 may be the rotational speed of rotor hub assembly 410 multiplied by a number of rotor blade assemblies connected to rotor hub assembly 410, in which case, oscillating pump system 402 may supply the tuning fluid to vibration isolator 404 at a blade pass frequency. Oscillating pump system 402 may be operated at a blade pass frequency even as the rotational speed of rotor hub assembly 410 changes. For example, if rotor hub assembly 410 includes four rotor blade assemblies, drive shaft 422 may rotate at four times (4×) the rotational speed of rotor hub assembly 410. If the rotational speed of rotor hub assembly 410 decreases by 10%, then the rotational speed of drive shaft 422 may decrease by 10% accordingly while still maintaining an oscillation frequency of vibration isolation system 400 that equals the blade pass frequency.

Referring to FIGS. 12A-12C in the drawings, a vibration isolation system is schematically illustrated and generally designated 500. Vibration isolation system 500 includes a pair of oscillating pump systems, namely, oscillating pump system 502 and oscillating pump system 504. Vibration isolation system 500 regulates an amount of oscillating fluid flow transmitted to vibration isolator 506, which can range from zero fluid flow, as illustrated in FIG. 12B, to maximum fluid flow, as illustrated in FIGS. 12A and 12C. Vibration isolation system 500 includes a fluid passage 508 that provides fluid communication between first oscillating ports 510, 512 of oscillating pump systems 502, 504 and vibration isolator fluid port 514. Vibration isolation system 500 also includes a fluid passage 516 that provides fluid communication between oscillating ports 518, 520 of oscillating pump systems 502, 504 and vibration isolator fluid port 522. Oscillator disks 524, 526 have a changeable phase relationship that determines an amount of oscillatory fluid flow delivered to vibration isolator 506. Oscillator disks 524, 526 are positionable into an infinite number of phase relationships including an in-phase relationship and an out-of-phase relationship. FIGS. 12A and 12C show vibration isolation system 500 to have an in-phase relationship such that oscillating pump systems 502, 504 deliver maximum oscillating fluid flow to vibration isolator 506. When in the in-phase relationship, oscillating ports 510, 512 are both either output ports, as shown in FIG. 12A, or input ports, as shown in FIG. 12C. Also, in the in-phase relationship, oscillating ports 518, 520 are both either input ports, as shown in FIG. 12A, or output ports, as shown in FIG. 12C. Operation of oscillating pump systems 502, 504 while oscillator disks 524, 526 are in the in-phase relationship cause vibration isolation system 500 to cycle between the states shown in FIGS. 12A and 12C to deliver oscillating fluid flow to vibration isolator 506. In the out-of-phase relationship, oscillating ports 510, 512 have input/output states that are opposite one another and oscillating ports 518, 520 have input/output states that are opposite one another such that fluid bypasses vibration isolator 506 altogether as shown in FIG. 12B.

In this manner, the phase relationship between oscillator disks 524, 526 determines whether oscillating fluid flow is delivered to vibration isolator 506. In addition, the amount of oscillating fluid flow delivered to vibration isolator 506 in a range between 0-100% may be determined by varying the phase relationship between oscillator disks 524, 526. The phase relationships shown in FIGS. 12A-12C represent maximum fluid flow (FIGS. 12A and 12C) and minimum, or substantially zero, fluid flow (FIG. 12B) being delivered to vibration isolator 506. Intermediate fluid flow levels are achievable by varying the phase relationship of oscillator disks 524, 526 between these two extremes, thereby allowing vibration isolation system 500 to control the amount of oscillating fluid flow to vibration isolator 506. Thus, different levels of oscillating fluid flow through vibration isolator 506 may be achieved by the relative phase difference, or number of degrees, oscillator disks 524, 526 are offset from one another. In some embodiments, controller 528 may drive oscillating pump systems 502, 504 at the same speed once the relative phasing of oscillator disks 524, 526 is determined and set. Controller 528 may change the phase relationship between oscillator disks 524, 526 by pausing or changing the speed of either or both of motors 530, 532 momentarily.

Referring to FIGS. 13A-13B and 14A-14B, an oscillating pump system is schematically illustrated and generally designated 600. In contrast to oscillating pump system 100 in FIG. 2, oscillating pump system 600 includes a bypass disk assembly 602 that selectively bypasses extension ports 604, 606 as well as any component(s) connected thereto, such as a vibration isolator. Bypass disk assembly 602 includes a generally circular bypass disk 608 having slots 610, 612 to route fluid therethrough. Bypass disk 608 has a first side 614 that is adjacent to oscillating ports 616, 618 of oscillator disk assembly 620. A bypass passage 622 and extension ports 604, 606 are adjacent to a second side 624 of bypass disk 608.

Figure 13A:
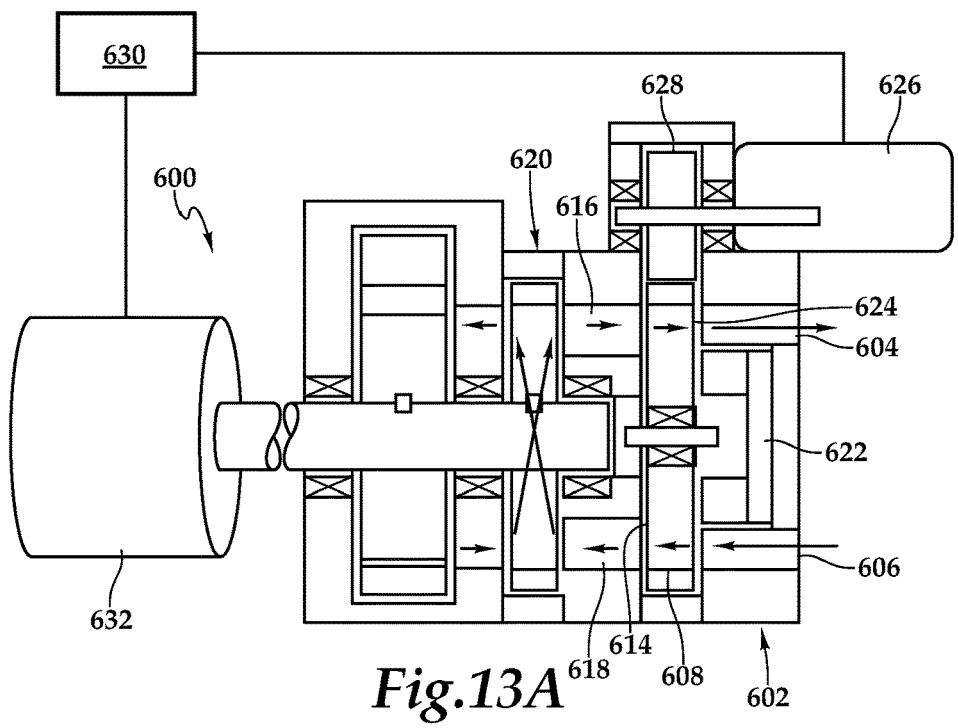
FIGS. 13A-13B are various views of an oscillating pump system having a bypass disk in a first state in accordance with embodiments of the present disclosure.
Figure 13B:
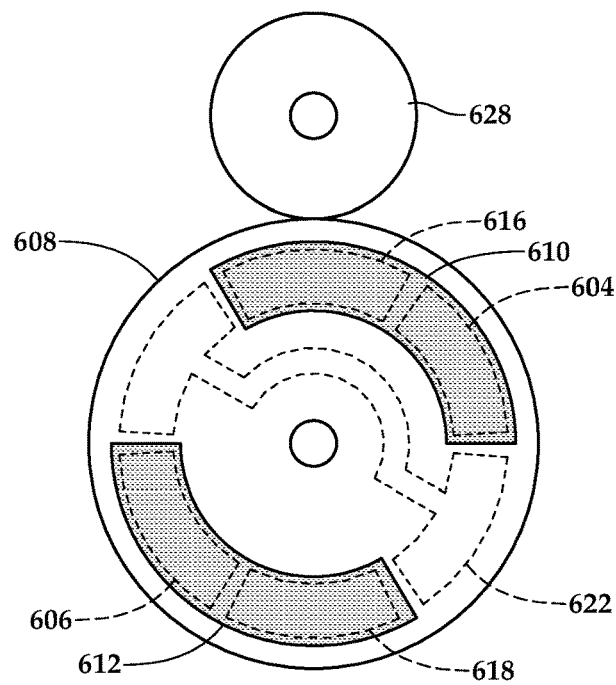

Bypass disk 608 is rotatable between a first state, shown in FIGS. 13A and 13B, and a second state, shown in FIGS.

14A and 14B. Bypass disk 608 is movable between the first and second states, or angular positions, using a motor 626 operable to move bypass disk 608 with a bypass drive gear 628. In the first state, bypass disk 608 provides fluid communication between oscillating port 616 and extension port 604 as well as between oscillating port 618 and extension port 606, as shown in FIGS. 13A and 13B. In the second state shown in FIGS. 14A and 14B, bypass disk 608 provides fluid communication between oscillating port 616 and oscillating port 618 via bypass passage 622, thereby bypassing extension ports 604, 606 as well as any component(s) fluidly coupled thereto. In some embodiments, bypass disk 608 may be positioned into an infinite number of positions between the first and second states shown in FIGS. 13B and 14B to regulate an amount of oscillating fluid flow transmitted to any component, such as a vibration isolator, fluidly connected to extension ports 604, 606. A controller 630 sends command signals to control the speed of motor 632 and the position of bypass drive gear 628 via motor 626.

While the illustrative embodiments have been described in regard to usage aboard an aircraft, the illustrative embodiments may be used in any environment in which oscillating fluid flow is utilized. For example, the illustrative embodiments may be used in other industries that utilize vibration isolation mounts on rotating machinery. The illustrative embodiments may also be used for harmonic individual blade control of main rotor blades. Any application that seeks to reduce vibration between two bodies may utilize the vibration isolation systems described herein.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An oscillating pump system comprising:
    a pump operable to circulate a fluid, the pump having a first port stage including an inlet port and an outlet port and a second port stage including a first oscillating port and a second oscillating port; and
    an oscillator disk disposed between the first port stage and the second port stage, the oscillator disk rotatable relative to the inlet port, the outlet port, the first oscillating port and the second oscillating port;
    wherein, during rotation, the oscillator disk alternatingly routes the fluid to the inlet port from the first and second oscillating ports; and
    wherein, during rotation, the oscillator disk alternatingly routes the fluid from the outlet port to the first and second oscillating ports.

2. The oscillating pump system as recited in claim 1 wherein the oscillator disk is rotatable between a plurality of phases including a first phase, wherein the oscillator disk routes the fluid from the outlet port to the second oscillating port and from the first oscillating port to the inlet port and a second phase, wherein the oscillator disk routes the fluid from the outlet port to the first oscillating port and from the second oscillating port to the inlet port.

3. The oscillating pump system as recited in claim 2 wherein each quarter turn of the oscillator disk changes the phase of the oscillator disk between the first and second phases.

4. The oscillating pump system as recited in claim 1 further comprising:
    a drive shaft operable to provide rotational energy to the pump and the oscillator disk; and
    a motor operable to provide rotational energy to the drive shaft.

5. The oscillating pump system as recited in claim 4 wherein the drive shaft is operable to rotate in a single direction.

6. The oscillating pump system as recited in claim 4 wherein the oscillating pump system oscillates the fluid at a frequency proportional to a rotational speed of the drive shaft.

7. The oscillating pump system as recited in claim 1 wherein the oscillator disk further comprises first and second slots to route the fluid therethrough.

8. The oscillating pump system as recited in claim 7 wherein the oscillator disk is rotatable between a plurality of phases including a first phase, wherein the first slot routes the fluid from the first oscillating port to the inlet port and the second slot routes the fluid from the outlet port to the second oscillating port and a second phase, wherein the first slot routes the fluid from the outlet port to the first oscillating port and the second slot routes the fluid from the second oscillating port to the inlet port.

9. The oscillating pump system as recited in claim 8 wherein the plurality of phases further comprises a third phase, wherein the first slot routes the fluid from the outlet port to the second oscillating port and the second slot routes the fluid from the first oscillating port to the inlet port and a fourth phase, wherein the first slot routes the fluid from the second oscillating port to the inlet port and the second slot routes the fluid from the outlet port to the first oscillating port.

10. The oscillating pump system as recited in claim 1 wherein the pump further comprises a positive displacement gerotor pump.

11. The oscillating pump system as recited in claim 1 further comprising a bypass fluid passage providing fluid communication between the first and second fluid oscillating ports and a fluid flow regulator operable to control fluid flow through the bypass fluid passage.

12. A vibration isolation system comprising:
    a vibration isolator operable to isolate vibration between at least two mechanical components, the vibration isolator having first and second fluid ports;
    a pump operable to circulate a fluid, the pump having a first port stage including an inlet port and an outlet port and a second port stage including a first oscillating port and a second oscillating port, the first oscillating port in fluid communication with the first fluid port of the vibration isolator, the second oscillating port in fluid communication with the second fluid port of the vibration isolator; and
    an oscillator disk disposed between the first port stage and the second port stage, the oscillator disk rotatable relative to the inlet port, the outlet port, the first oscillating port and the second oscillating port;

wherein, during rotation, the oscillator disk alternatingly routes the fluid to the inlet port from the first and second oscillating ports; and wherein, during rotation, the oscillator disk alternatingly routes the fluid from the outlet port to the first and second oscillating ports.

13. The vibration isolation system as recited in claim 12 wherein the vibration isolator further comprises a Liquid Inertia Vibration Eliminator unit having a tuning passage disposed between the first and second fluid ports; and wherein the fluid further comprises a tuning fluid moveable through the tuning passage to isolate vibration between the at least two mechanical components.

14. The vibration isolation system as recited in claim 12 further comprising:

a bypass fluid passage providing fluid communication between the first and second oscillating ports; and a fluid flow regulator operable to control fluid flow through the bypass fluid passage.

15. The vibration isolation system as recited in claim 12 further comprising:

a second pump operable to circulate the fluid, the second pump having a first port stage including an inlet port and an outlet port and a second port stage including a first oscillating port and a second oscillating port, the first oscillating port of the second pump in fluid communication with the first fluid port of the vibration isolator, the second oscillating port of the second pump in fluid communication with the second fluid port of the vibration isolator; and a second oscillator disk disposed between the first port stage and the second port stage of the second pump, the second oscillator disk rotatable relative to the inlet port, the outlet port, the first oscillating port and the second oscillating port of the second pump;

wherein, during rotation, the second oscillator disk alternatingly routes the fluid to the inlet port of the second pump from the first and second oscillating ports of the second pump;

wherein, during rotation, the second oscillator disk alternatingly routes the fluid from the outlet port of the second pump to the first and second oscillating ports of the second pump; and wherein the oscillator disk and the second oscillator disk have a changeable phase relationship determining an amount of oscillating fluid flow delivered to the vibration isolator.

16. A rotorcraft comprising:

a fuselage;

a rotor hub assembly rotatable relative to the fuselage;

a vibration isolator disposed between the fuselage and the rotor hub assembly to isolate vibration therebetween, the vibration isolator having first and second fluid ports;

a pump operable to circulate a fluid, the pump having a first port stage including an inlet port and an outlet port and a second port stage including a first oscillating port and a second oscillating port, the first oscillating port in fluid communication with the first fluid port of the vibration isolator, the second oscillating port in fluid communication with the second fluid port of the vibration isolator; and an oscillator disk disposed between the first port stage and the second port stage, the oscillator disk rotatable relative to the inlet port, the outlet port, the first oscillating port and the second oscillating port;

wherein, during rotation, the oscillator disk alternatingly routes the fluid to the inlet port from the first and second oscillating ports; and wherein, during rotation, the oscillator disk alternatingly routes the fluid from the outlet port to the first and second oscillating ports.

17. The rotorcraft as recited in claim 16 further comprising:

a drive shaft operable to provide rotational energy to the pump and the oscillator disk, the drive shaft having a rotational speed;

wherein the rotor hub assembly has a rotational speed; and wherein the rotational speed of the drive shaft is proportional to the rotational speed of the rotor hub assembly.

18. The rotorcraft as recited in claim 17 wherein the rotor hub assembly further comprises a number of rotor blade assemblies; and wherein the rotational speed of the drive shaft is proportional to the rotational speed of the rotor hub assembly multiplied by the number of rotor blade assemblies.

19. The rotorcraft as recited in claim 16 further comprising:

at least one vibration sensor to detect a vibration of a portion of the rotorcraft to which the at least one vibration sensor is attached; and a controller in data communication with the at least one vibration sensor, the controller operable to send a command to drive the pump and the oscillator disk to oscillate the fluid within the vibration isolator at a frequency to reduce the vibration detected by the at least one vibration sensor.

20. The rotorcraft as recited in claim 16 wherein the rotor hub assembly further comprises a plurality of rotor blade assemblies rotatable at a blade pass frequency; and wherein the pump oscillates the fluid within the vibration isolator at the blade pass frequency.

* * * * *